United States Patent
Kao et al.

(10) Patent No.: US 9,530,231 B2
(45) Date of Patent: Dec. 27, 2016

(54) METHOD FOR GENERATING MASKING IMAGE USING GENERAL POLYGONAL MASK

(71) Applicant: NOVATEK Microelectronics Corp., Hsin-Chu (TW)

(72) Inventors: Jau-Hong Kao, Hsinchu County (TW); Shiang-Fei Wang, Tainan (TW); Yi-Jen Wu, Hsinchu County (TW); Chih-Huang Lin, Hsinchu (TW); Min-Hui Chu, Hsinchu County (TW); Hong-Chu Chen, Hsinchu (TW); Chi-Fan Liou, Taoyuan (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 82 days.

(21) Appl. No.: 14/639,124

(22) Filed: Mar. 5, 2015

(65) Prior Publication Data

US 2016/0260235 A1 Sep. 8, 2016

(51) Int. Cl.
*G06T 11/40* (2006.01)
*G06T 15/40* (2011.01)

(52) U.S. Cl.
CPC ............. *G06T 11/40* (2013.01); *G06T 15/405* (2013.01); *G06T 2200/12* (2013.01)

(58) Field of Classification Search
None
See application file for complete search history.

(56) References Cited

U.S. PATENT DOCUMENTS

| | | | | |
|---|---|---|---|---|
| 2005/0068437 A1* | 3/2005 | Hayasaka | ........ | G08B 13/19682 348/294 |
| 2005/0275723 A1* | 12/2005 | Sablak | .................. | H04N 7/183 348/169 |
| 2006/0187237 A1* | 8/2006 | Park | ................. | G08B 13/19686 345/625 |
| 2011/0273619 A1* | 11/2011 | Kamei | ..................... | G06T 7/20 348/584 |
| 2012/0098854 A1* | 4/2012 | Ohnishi | ................. | G03B 21/26 345/626 |
| 2012/0139790 A1* | 6/2012 | Wirola | .................. | G01S 5/0252 342/385 |
| 2013/0021433 A1* | 1/2013 | Belsarkar | ............... | H04N 7/181 348/36 |

(Continued)

OTHER PUBLICATIONS

Sunday, "Inclusion of a Point in a Polygon," 2013, retrieved from http://web.archive.org/web/20130126163405/http://geomalgorithms.com/a03-_inclusion.html on Jul. 19, 2016.*

(Continued)

*Primary Examiner* — Ryan D McCulley
(74) *Attorney, Agent, or Firm* — Winston Hsu; Scott Margo

(57) ABSTRACT

A method for generating masking image using general polygonal mask includes receiving a pixel of a raw image and a polygon vertices array corresponding to a polygonal mask, determining whether the pixel is inside the polygonal mask, labeling the pixel to be a masked pixel if the pixel is inside the polygonal mask, or labeling the pixel to be a visible pixel if the pixel is outside the polygonal mask, and outputting the masked pixel or the visible pixel to generate the masking image.

8 Claims, 9 Drawing Sheets

(56) References Cited

U.S. PATENT DOCUMENTS

| | | | | |
|---|---|---|---|---|
| 2014/0043342 A1* | 2/2014 | Goel | ................. | G06T 9/00 |
| | | | | 345/501 |
| 2014/0085463 A1* | 3/2014 | Kwon | ................. | G06T 11/00 |
| | | | | 348/143 |
| 2015/0145992 A1* | 5/2015 | Traff | ................. | G06T 11/60 |
| | | | | 348/143 |

OTHER PUBLICATIONS

"Coloring and Texturing Polygons," 2009, retrieved from http://www.cs.tufts.edu/~sarasu/courses/comp175-2009fa/pdf/comp175-06-color-texture.pdf on Jul. 19, 2016.*

* cited by examiner

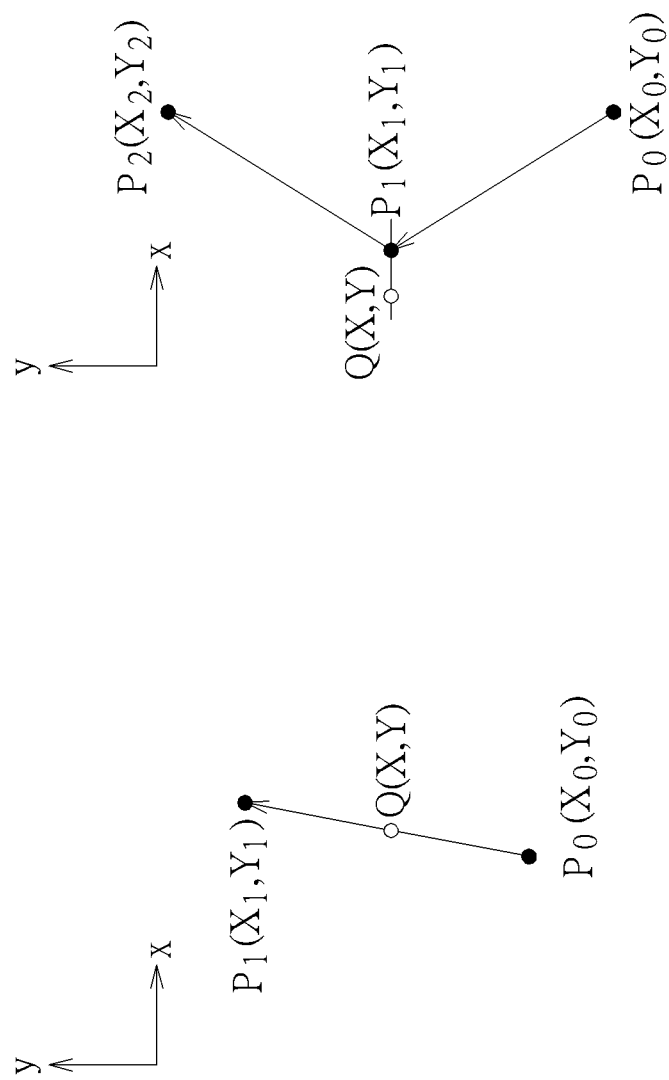

METHOD FOR GENERATING MASKING IMAGE USING GENERAL POLYGONAL MASK

BACKGROUND OF THE INVENTION

1. Field of the Invention

The present invention relates to a method for generating a masking image using a general polygonal mask, and more particularly, to a method for generating the masking image using the general polygonal mask via determining relative locations between pixels and edges of the general polygonal mask.

2. Description of the Prior Art

Image masking refers to an image processing scheme that a certain region or an image mask is marked in an image to perform specific image processing or state configuration. The image processing, such as pixel values adjustment, and transparent, semi-transparent, opaque, and/or grid processing(s), may be performed to pixels inside the image mask, while pixels outside the image mask may remain the same or be processed with other image processing. As a result, a masking image may be generated by combining the pixels inside and outside the image mask.

In practice, image masking is widely used in surveillance systems for privacy protection and/or event detection. Please refer to FIG. 1, which illustrates a schematic diagram of a surveillance system 1. The surveillance system 1 includes one or more image capturing devices, a network video recorder (NVR)/digital video recorder (DVR), a monitor, and one or more user-end devices. The image capturing devices may be any kinds of surveillance cameras, such as Pan-Tilt-Zoom (PTZ) cameras, fixed cameras, System on Chip (SoC) image sensors, Digital Signal Processing (DSP) of Graphical Processing Units (GPUs) or Central Processing Units (CPUs), etc. The user-end devices may be a smart phone, a tablet computer, or a personal computer (PC), etc. The image capturing devices may connect to the NVR/DVR via a network hub or a network router. The NVR/DVR may further connect to a monitoring wall including a plurality of sub-monitors and the user-end devices via the Internet to instantly share captured images or videos to realize far-end monitoring.

For privacy protection, the surveillance system 1 may monitor and record scenes other than private regions; for example, the private regions may be masked to be invisible. For event detection in an enabled region of the image, the surveillance system 1 usually activates a record trigger or an event alarm by motion detection.

However, some regular variations happening in the enabled regions may cause a false alarm, for instance, braches and leaves swaying, traffic lights or other light sources changing. Therefore, one or more image masks are required to exclude the regular variations from the detected image to avoid the false alarm. In addition, the surveillance system 1 may achieve regular parameters configuration, different parameters (e.g. sensitivities) may be configured for the enabled region in the image, which also mitigates the false alarm.

The image mask or the enabled region of the image may have irregular, rectangular, or polygon shape to adapt to practical requirements. The image mask having the irregular shape may have a good flexibility to be suitable for complicated geometric conversion; however, memory buffer(s) may be required in order to perform the complicated geometric conversion, which leads to a larger hardware area as well as a high hardware cost. The image mask having the rectangular shape may have less flexibility but no memory buffer(s) is required to have a low hardware cost. The image mask having the polygon shape may have a middle flexibility compared with the irregular and rectangular shapes, the memory buffer(s) is optional, and thus a hardware cost for the polygonal image mask could be low or high.

Ideally, image masking shall be implemented on the front-end image capturing devices, the NVR/DVR and/or the user-end devices based on different levels of privacy protection and application requirements. However, since the memory buffer(s) brings the larger hardware area and the high hardware cost, only the image mask having the regular shape is implemental on the front-end image capturing devices, which limits a flexibility of the surveillance system 1.

Therefore, how to broaden the flexibility of the surveillance system 1 without the hardware limitation due to the memory buffer(s) has become a topic in the industry.

SUMMARY OF THE INVENTION

It is therefore an objective of the present invention to provide a method of generating masking image using polygonal mask.

The present invention discloses a method for generating masking image using general polygonal mask includes receiving a pixel of a raw image and a polygon vertices array corresponding to a polygonal mask, determining whether the pixel is inside the polygonal mask, labeling the pixel to be a masked pixel if the pixel is inside the polygonal mask, or labeling the pixel to be a visible pixel if the pixel is outside the polygonal mask, and outputting the masked pixel or the visible pixel to generate the masking image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5A to FIG. 5D illustrate examples of relative locations between a pixel and an edge and corresponding directions of forces of two vectors determined by the pixel and the edge.

DETAILED DESCRIPTION

Figure 1:
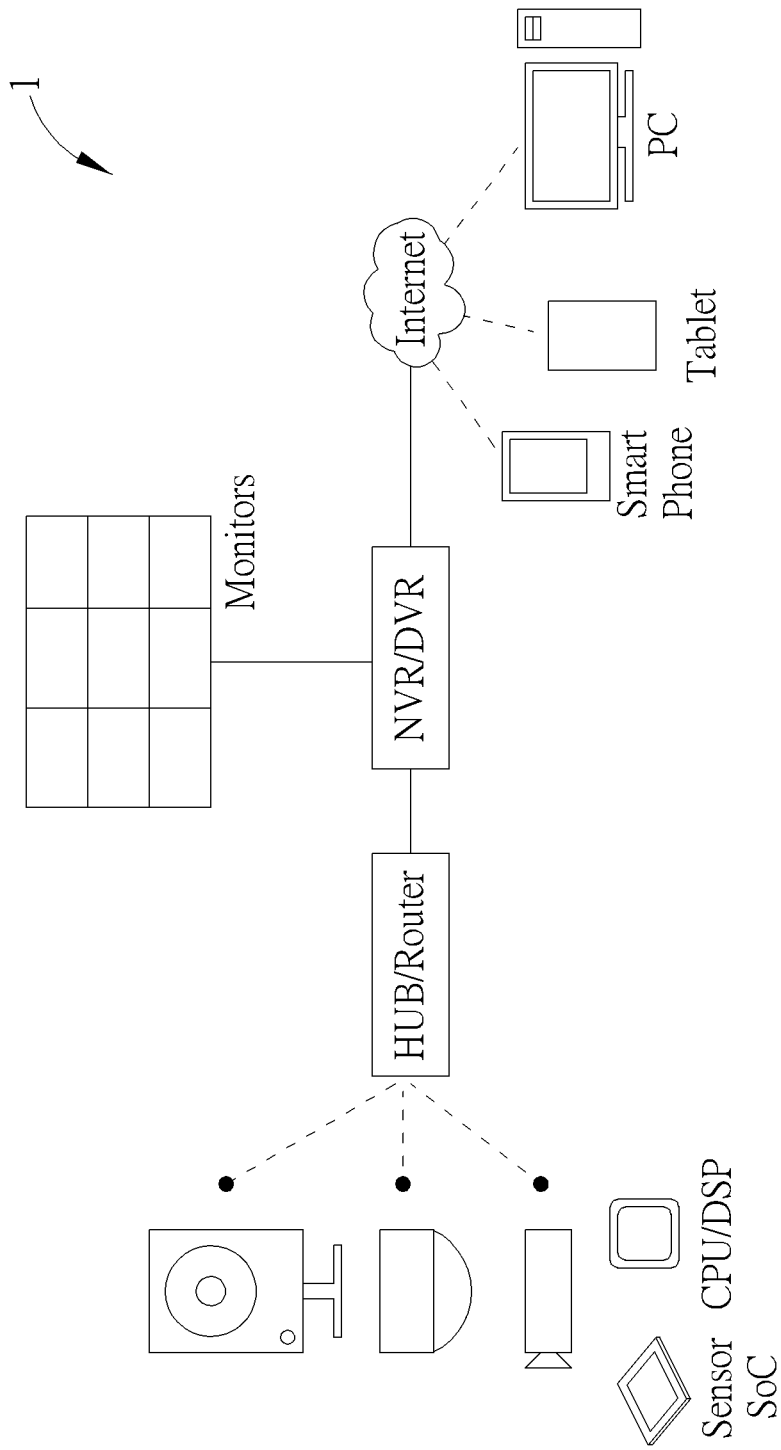
FIG. 1 illustrates a schematic diagram of a surveillance system.

In order to broaden a flexibility of the surveillance system 1 shown in FIG. 1, the present invention provides a method to implement image masking using the polygonal mask without the hardware limitation due to the memory buffer(s). In such a situation, a circuit for image masking may be easily integrated into any devices of the surveillance system 1. In addition, a polygon may be approximate to an irregular shape by properly setting vertices of the polygon, which also broadens the flexibility of the surveillance system 1.

Figure 2:
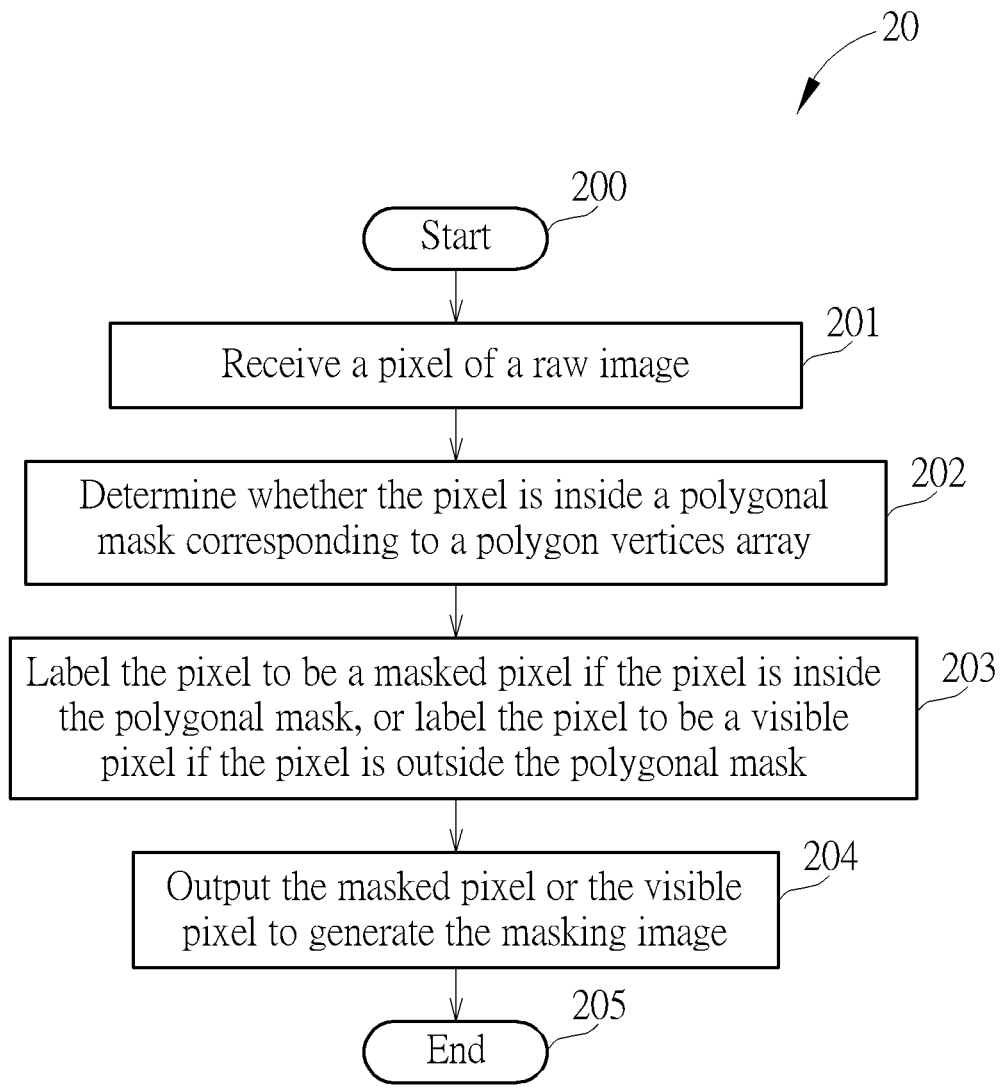
FIG. 2 illustrates a flowchart of a process according to an embodiment of the present invention.
Figure 3:
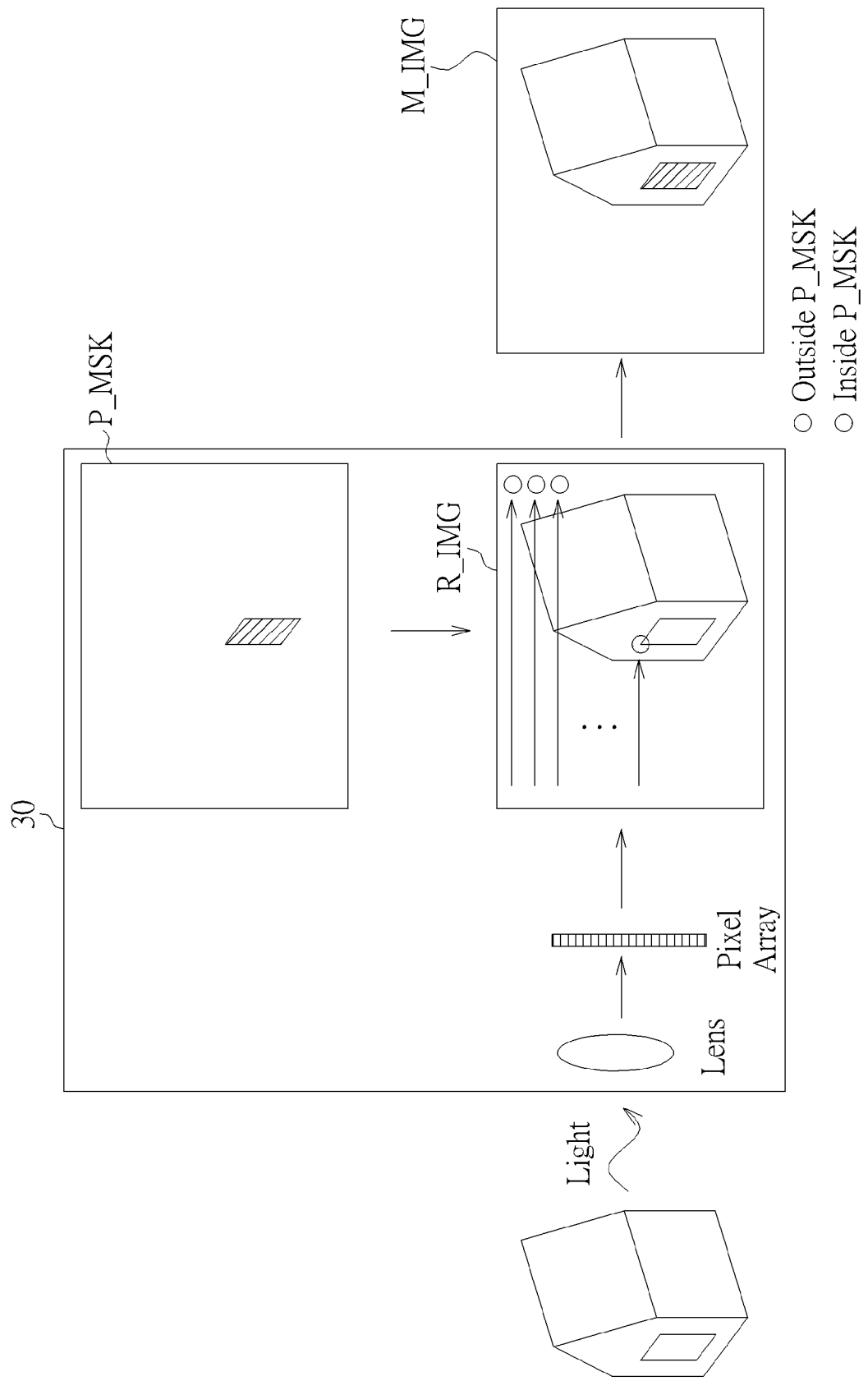
FIG. 3 illustrates an image sensor for generating a masking image.

Specifically, please refer to FIG. 2 and FIG. 3 at the same time. FIG. 2 illustrates a flowchart of a process 20 according to an embodiment of the present invention. FIG. 3 illustrates an image sensor 30 for generating a masking image M_IMG using a polygonal mask P_MSK. The process 20 may describe operations of the image sensor 30 and include the following steps:

Step 200: Start.

Step 201: Receive a pixel of a raw image.

Step 202: Determine whether the pixel is inside a polygonal mask corresponding to a polygon vertices array.

Step 202: Label the pixel to be a masked pixel if the pixel is inside the polygonal mask, or label the pixel to be a visible pixel if the pixel is outside the polygonal mask.

Step 204: Output the masked pixel or the visible pixel to generate the masking image.

Step 205: End.

In Step 201, a raw image R_IMG captured by a lens of the image sensor 30 may be converted into a pixel array such that the image sensor 30 may sequentially receive and scan one pixel of the raw image R_IMG at one time. In step 202, the image sensor 30 may determine whether the pixel is inside or outside the polygonal mask P_MSK corresponding to a closed polygon vertices array, wherein edges of the polygonal mask P_MSK may be defined according to the vertices array to help the image sensor 30 recognizing whether the pixel is inside or outside the polygonal mask P_MSK. Note that vertices in the polygonal mask P_MSK should be ordered sequentially, either clockwise or counter-clockwise.

In step 203, the image sensor 30 may label the pixel to be a masked pixel (denoted with a dotted circle) if it is inside the polygonal mask P_MSK; or, the image sensor 30 may label the pixel to be a visible pixel (denoted with a blank circle) if it is outside the polygonal mask P_MSK.

In Step 204, the image sensor 30 may output the masked pixel or the visible pixel, and start the process 20 again to receive and scan a next pixel of the pixel array. After all the pixels of the pixel array are labeled to be the masked or visible pixels, the masking image M_IMG may be completely generated.

Further, in order to determine whether the pixel is inside the polygonal mask P_MSK, a function F(L,Q) may be defined as follows:

$$F(L, Q) = \begin{cases} 1: & \text{pixel } Q \text{ intersects edge } L \text{ at its right side} \\ 0: & \text{other} \end{cases} \quad (1)$$

Wherein, L is a line segment or an edge of a polygon (i.e. the polygonal mask P_MSK), and Q is a pixel. In detail, if the pixel Q intersects the edge L at its right side, in other words, the pixel Q locates at a left side of the edge L, an outcome of function (1) is one. Otherwise, the outcome of function (1) is zero for any other cases.

Given a polygon has N edges, and two consecutive vertices $P_i$ and $P_{i+1}$ of a vertices array of the polygon form the edge L (i.e. one edge of the polygonal mask P_MSK). A count of outcomes of function (1) may be defined as follows:

$$C = \sum_{i=0}^{N} F(\overline{P_i P_{i+1}}, Q) \quad (2)$$

Noticeably, based on Even-Odd Rule, the pixel Q must be outside the polygon if the count C is even.

Figure 4A:
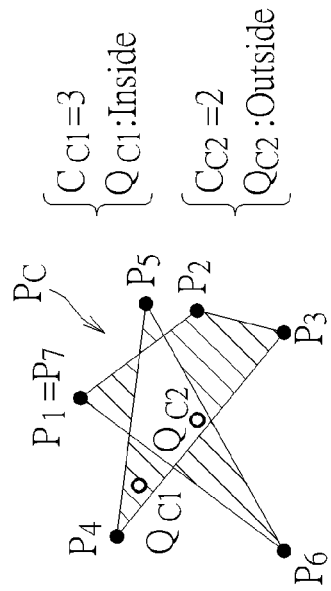
FIG. 4A to FIG. 4C illustrate examples of relative locations between a pixel and a polygonal mask.
Figure 4B:
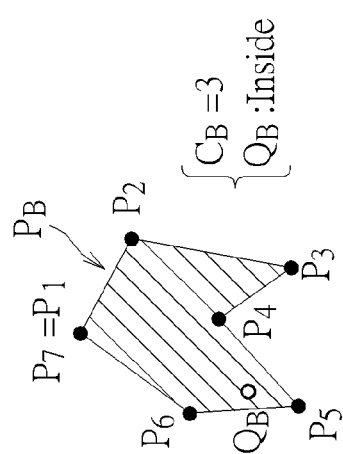
Figure 4C:
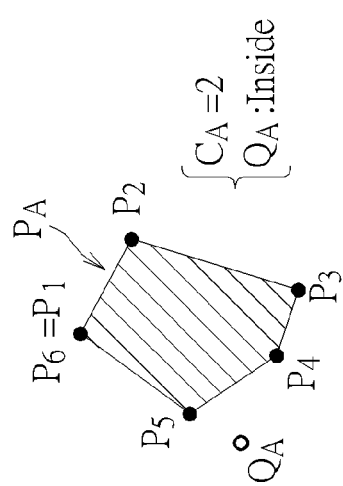

For example, please refer to FIG. 4A to FIG. 4C, which illustrate examples of relative locations between the pixel Q and the polygonal mask P_MSK and corresponding outcomes of function (2).

In FIG. 4A, given a 5-edged polygon $P_A$ corresponding to vertices $P_1$ to $P_6$, wherein $P_1=P_6$. A pixel $Q_A$ intersects lines $\overline{P_2P_3}$ and $\overline{P_4P_5}$ at its right side, so a count $C_A$ is even ($C_A=2$), and thus the pixel $Q_A$ is determined to be outside the polygon $P_A$.

In FIG. 4B, given a 6-edged polygon $P_B$ corresponding to vertices $P_1$ to $P_7$, wherein $P_1=P_7$. A pixel $Q_B$ intersects lines $\overline{P_2P_3}$, $\overline{P_3P_4}$ and $\overline{P_4P_5}$ at its right side, so a count $C_B$ is odd ($C_B=3$), and thus the pixel $Q_B$ is determined to be inside of the polygon $P_B$.

In FIG. 4C, given a 6-edged polygon $P_C$ corresponding to vertices $P_1$ to $P_7$, wherein $P_1=P_7$. A pixel $Q_{C1}$ intersects lines $\overline{P_1P_2}/\overline{P_1P_6}$ and $\overline{P_4P_5}$ at its right side, so a count $C_{C1}$ is odd ($C_{C1}=3$), and thus the pixel $Q_{C1}$ is determined to be inside of the polygon $P_C$. A pixel $Q_{C2}$ intersects lines $\overline{P_2P_3}$ and $\overline{P_5P_6}$, at the right side, so a count $C_{C2}$ is even ($C_{C2}=2$), and thus the pixel $Q_{C2}$ is determined to be outside the polygon $P_C$.

In function (1), "pixel Q intersects edge L at its right side" is equivalent to "pixel Q is at the left side of edge L". For a three-dimensional space, three points including two terminals of the edge L and the pixel Q may form two vectors, and computing a cross product of the two vectors may determine a direction of a force of the two vectors according to Right-Hand-Rule. In other words, a relative location between the pixel Q and the edge L may be determined according to the direction of the force of the two vectors of the pixel Q and the edge L.

Specifically, please refer to FIG. 5A to FIG. 5D, which illustrate examples of relative locations between the pixel Q and the edge L and corresponding directions of forces of the two vectors determined by the pixel Q and the edge L. Given coordinates of the pixel Q(X,Y), a start point $P_0(X_0,Y_0)$ and a terminal point $P_1(X_1,Y_1)$ of the edge L, a cross product (i.e. determinant) of a force $\vec{F}$ may be computed as follows:

$$\vec{F} = \vec{v} \times \vec{L} = \det \begin{vmatrix} \vec{x} & \vec{y} & \vec{z} \\ (X_1 - X) & (Y_1 - Y) & 0 \\ (X_1 - X_0) & (Y_1 - Y_0) & 0 \end{vmatrix} \quad (3.1)$$

$$\vec{F} = [(X_1 - X)(Y_1 - Y_0) - (X_1 - X_0)(Y_1 - Y)]\vec{z} \quad (3.2)$$

Wherein, $\vec{v}$ is a vector of the pixel Q(X,Y) and the terminal point $P_1(X_1,Y_1)$, $\vec{L}$ is a vector of the start point $P_0(X_0,Y_0)$ and the terminal point $P_1(X_1,Y_1)$, and θ is a rotation angle rotating from the vector $\vec{v}$ toward the vector $\vec{L}$.

Figures 5A, 5B:
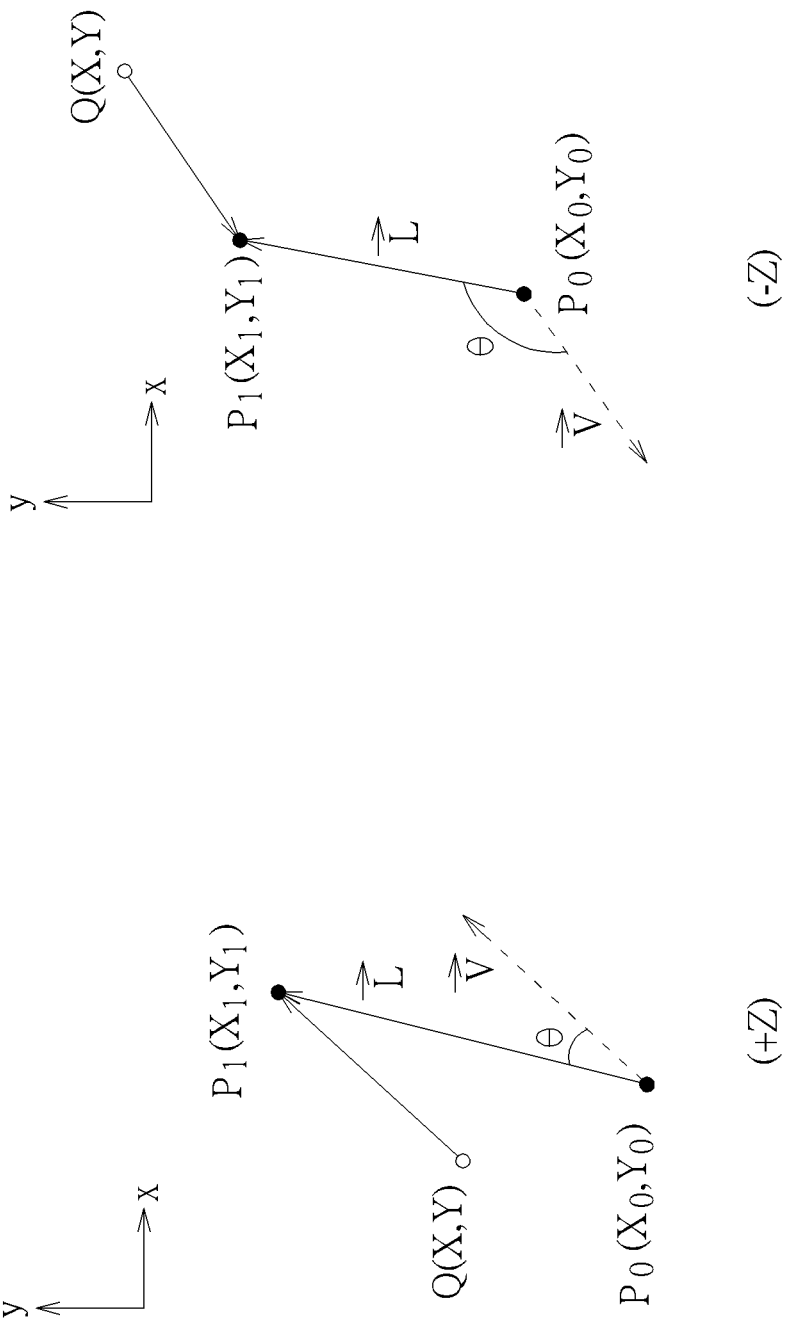

In FIG. 5A, the vector $\vec{v}$ of the pixel Q and the terminal point $P_1$ may be displaced such that the pixel Q is overlapped with the start point $P_0$. Based on the Right-Hand-Rule, the vector $\vec{v}$ rotates counterclockwise toward the vector $\vec{L}$, thereby the force $\vec{F}$ directs outward from the background of FIG. 5A, and an outcome of function (3.2) is positive. For a case that coordinates of the start point $P_0(X_0,Y_0)$ and the terminal point $P_1(X_1,Y_1)$ are swapped, the force $\vec{F}$ directs inward to the background of FIG. 5A, and the outcome of function (3.2) is negative.

In FIG. 5B, the vector $\vec{v}$ of the pixel Q and the terminal point $P_1$ may be displaced such that the pixel Q is overlapped with the start point $P_0$. Based on the Right-Hand-Rule, the vector $\vec{v}$ rotates clockwise toward the vector $\vec{L}$, thereby the force $\vec{F}$ directs inward to the background of FIG. 5B, and an outcome of function (3.2) is negative. For a case that coordinates of the start point $P_0(X_0,Y_0)$ and the terminal point $P_1(X_1,Y_1)$ are swapped, the force $\vec{F}$ directs outward from the background of FIG. 5B, and the outcome of function (3.2) is negative.

For a case that coordinates of the start point $P_0(X_0,Y_0)$ and the terminal point $P_1(X_1,Y_1)$ are swapped, the force $\vec{F}$ directs outward from the background of FIG. 5B, and the outcome of function (3.2) is positive.

In FIG. 5C, the pixel Q is on the edge L (i.e. collinear), for both the cases that the edge L directs upwardly and downwardly, the vector $\vec{v}$ is parallel to the vector $\vec{L}$, thereby the cross product of the vectors $\vec{v}$ and $\vec{L}$ is zero, the rotation angle θ is zero, and the direction of the force $\vec{F}$ is arbitrary.

Comparison of FIG. 5A to FIG. 5C is summarized in Table 1:

TABLE 1

|  | FIG. 5A | | FIG. 5B | | FIG. 5C |
| --- | --- | --- | --- | --- | --- |
| $\vec{L}$ | up | down | Up | down | collinear |
| θ | CCW | CW | CW | CCW | 0 |
| $\vec{F}$ | >0 (+z) | <0 (−z) | <0 (−z) | >0 (+z) | 0 |
| Location | Left | | Right | | on the L |

In FIG. 5D, the coordinate Y of the pixel Q is equal to the coordinate $Y_1$ of the terminal point $P_1$ (i.e. $Y=Y_1$), the pixel Q is at the left of both the edges $\overline{P_0P_1}$ and $\overline{P_1P_2}$. In such a situation, only one of the edges $\overline{P_0P_1}$ and $\overline{P_1P_2}$ is necessary to determine the relative location of the pixel Q, which prevents the count C from counting twice if the pixel Q is at the left of both the edges $\overline{P_0P_1}$ and $\overline{P_1P_2}$.

Further, the pixel Q may intersect the edge L only when the pixel Q is bounded by the edge L in one dimension. Otherwise, the pixel Q does not intersect the edge L. For example, in FIG. 5A, the coordinate Y of the pixel Q(X,Y) is located between the coordinate $Y_0$ of the start point $P_0(X_0,Y_0)$ and the coordinate $Y_1$ of the terminal point $P_1(X_1,Y_1)$ (i.e. $Y_1<Y<Y_0$), and thus the pixel Q may intersect the edge L. On the contrary, in FIG. 5B, the coordinate Y of the pixel Q(X,Y) is greater than the coordinate $Y_0$ and $Y_1$ of the points $P_0(X_0,Y_0)$ and $P_1(X_1,Y_1)$, i.e. $Y>Y_1>Y_0$), and thus the pixel Q may not intersect the edge L.

In summary of the cases discussed in FIG. 4A to FIG. 4C and FIG. 5A to FIG. 5D, an algorithm may be designed accordingly to determine the relative location between the pixel Q and any edges, and determine whether the pixel Q is inside or outside the polygonal mask.

Figure 6:
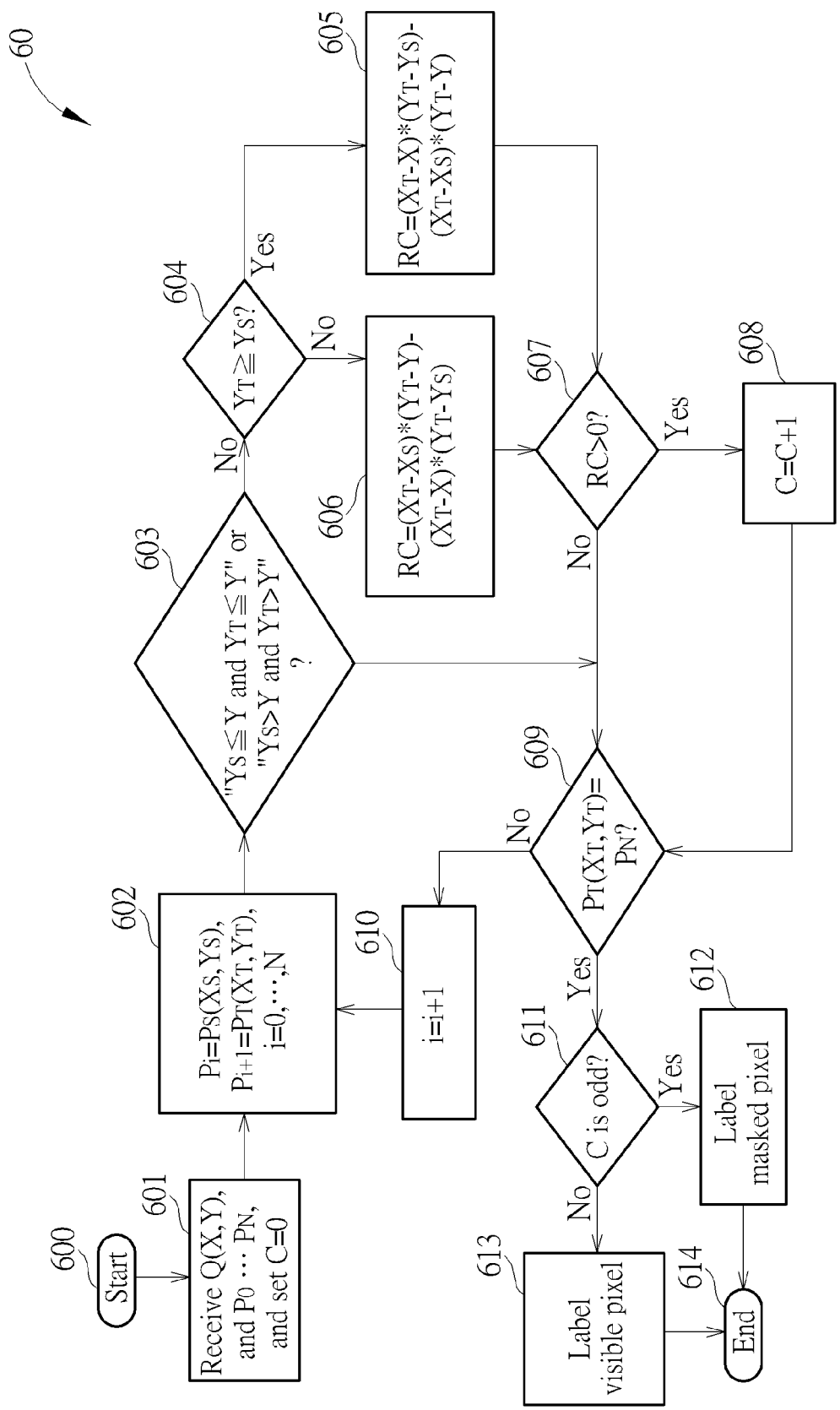
FIG. 6 illustrates a flowchart of a process according to a first embodiment of the present invention.

Please refer to FIG. 6, which illustrates a flowchart of a process 60 according to a first embodiment of the present invention. The process 60 may be executed by the image sensor 30 to determine whether the pixel Q is inside or outside a polygonal mask having N edges. The process 60 includes the following steps:

Step 600: Start.
Step 601: Receive a pixel Q(X,Y) and a vertices array including vertices $P_0$ to $P_N$, and set a count C to be zero.
Step 602: Set a vertex $P_i$ to be a start point $P_S(X_S,Y_S)$, and a vertex $P_{i+1}$ to be a terminal point $P_T(X_T,Y_T)$, wherein an indication i is 0, . . . , N.
Step 603: Check if a condition "$Y_S \leq Y$ and $Y_T \leq Y$" or "$Y_S > Y$ and $Y_T > Y$" is satisfied? Go to Step 609 if yes; go to Step 604 if no.
Step 604: Check if $Y_T \geq Y_S$? Go to Step 605 if yes; go to Step 606 if no.
Step 605: Compute a cross product RC,
wherein $RC=(X_T-X)*(Y_T-Y_S)-(X_T-X_S)*(Y_T-Y)$. Go to Step 607.
Step 606: Compute a cross product RC, wherein $RC=(X_T-X_S)*(Y_T-Y)-(X_T-X)*(Y_T-Y_S)$.
Step 607: Check if the cross product RC is greater than zero ? Go to Step 608 if yes; go to Step 609 if no.
Step 608: Increase the count C by one.
Step 609: Check if the terminal point $P_T(X_T,Y_T)$ is the vertex $P_N$? Go to Step 610 if no; go to Step 611 if yes.
Step 610: Increase the indication i by one. Go to Step 602.
Step 611: Check if the count C is odd? Go to Step 612 if yes; go to Step 613 if no.
Step 612: Label the pixel Q to be a masked pixel. End.
Step 613: Label the pixel Q to be a visible pixel.
Step 614: End.

In Step 601, the image sensor 30 may receive the pixel Q(X,Y) of the raw image R_IMG and the vertices array including the vertices $P_0$ to $P_N$, $P_N=P_0$, which forms the N edges of the polygonal mask, i.e. $\overline{P_0P_1}$ . . . $\overline{P_{N-1}P_N}$. Meanwhile, the image sensor 30 may set the count C to be zero when receiving the pixel Q(X,Y) of the raw image R_IMG and the vertices array to start counting how many edges of the polygonal mask is at the right of the pixel Q(X,Y).

In Step 602, the image sensor 30 may set the vertex $P_i$ to be the start point $P_S(X_S,Y_S)$, and the vertex $P_{i+1}$ to be the terminal point $P_T(X_T,Y_T)$ to select an edge $\overline{P_SP_T}$ of the polygonal mask. Note that the start point $P_S(X_S,Y_S)$ and the terminal point $P_T(X_T,Y_T)$ may be representative of any two consecutive vertices $P_i$ and $P_{i+1}$, e.g. points $P_1$ and $P_2$, . . . , and points $P_{N-1}$ and $P_N$. The edge $\overline{P_SP_T}$ may be representative of any edges of the polygonal mask.

In Step 603, the image sensor 30 may perform a boundary test procedure. The image sensor 30 may check if the condition "$Y_S \leq Y$ and $Y_T \leq Y$" or "$Y_S > Y$ and $Y_T > Y$" is satisfied to determine if the pixel Q (X,Y) is bounded by the start point $P_S(X_S,Y_S)$ and the terminal point $P_T(X_T,Y_T)$ in a y-dimension. The pixel Q(X,Y) is bounded by the points $P_S(X_S,Y_S)$ and $P_T(X_T,Y_T)$ if the condition is not satisfied. The pixel Q(X,Y) is out of boundary if the condition is satisfied, and then, the image sensor 30 may proceed to Step 609 to select a next edge of the polygonal mask (no of Step 609) or label the pixel Q(X,Y) (yes of Step 609).

In Step 604, the image sensor 30 may determine a direction of the vector of the points $P_S(X_S,Y_S)$ and $P_T(X_T,Y_T)$ by comparing the coordinate $Y_S$ with $Y_T$ of the points $P_S(X_S,Y_S)$ and $P_T(X_T,Y_T)$, wherein the vector of the points $P_S(X_S,Y_S)$ and $P_T(X_T,Y_T)$ directs upwardly if $Y_T \geq Y_S$, while the vector directs downwardly if $Y_T < Y_S$.

In Steps 605 and 606, the image sensor 30 may compute the cross product RC according to function (3.2) and the direction of the vector of the points $P_S(X_S,Y_S)$ and $P_T(X_T,Y_T)$. The cross product RC is computed according to function (3.2) if the vector directs upwardly (Step 605), while the cross product RC is computed according to a negative of function (3.2) if the vector directs downwardly (Step 606).

In Step 607, the image sensor 30 may check if the cross product RC is greater than zero to determine if the pixel Q is at the left of the edge formed by the points $P_S(X_S,Y_S)$ and $P_T(X_T,Y_T)$, so as to compute the count C.

In Step 608, the pixel Q(X,Y) is at the left of the edge $\overline{P_S P_T}$ if the cross product RC is greater than zero, so the count C is increased by one. The pixel Q(X,Y) is at the right of the edge $\overline{P_S P_T}$ if the cross product RC is smaller than zero, so the count C is increased by zero, and the image sensor 30 may proceed to select a next edge of the polygonal mask.

In Step 609 and Step 610, the image sensor 30 may check if the terminal point $P_T(X_T,Y_T)$ is the last vertex $P_N$ to determine whether the relative locations between the pixel Q(X,Y) and all the edges of the polygonal mask are checked in order to count how many edges of the polygonal mask is at the right of the pixel Q(X,Y). The image sensor 30 may increase the indication i by one to reset the points $P_S(X_S,Y_S)$ and $P_T(X_T,Y_T)$ according to the indication. In other words, the image sensor 30 may select the next edge of the polygonal mask if the terminal point $P_T(X_T,Y_T)$ is not the last vertex $P_N$, and perform Step 602 again.

In Step 611 to Step 613, the image sensor 30 may check if the count C is odd to determine the relative location of the pixel Q(X,Y) to label the pixel Q(X,Y) to be a masked pixel or a visible pixel. The pixel Q(X,Y) is labeled to be the masked pixel if the count C is odd, i.e. the pixel Q(X,Y) is inside the polygonal mask. The pixel Q(X,Y) is labeled to be the visible pixel if the count C is even, i.e. the pixel Q(X,Y) is outside the polygonal mask.

By executing the process 60, the image sensor 30 may determine whether the pixel Q(X,Y) is inside or outside the polygonal mask, and the image sensor 30 may start the process 60 again to determine whether a next pixel of the raw image R_IMG is inside or outside the polygonal mask. Until all the pixels of the raw image R_IMG are checked, the image sensor 30 may generate the masking image M_IMG.

Noticeably, there are simple calculations in the process 60, e.g. logical comparison, and add, minus and multiple operations, while a divide operation is comparatively complicated and requires a greater circuit area. Therefore, the process 60 may be realized by simple circuits to save a circuit area of the image sensor 30. In addition, since the pixels of the raw image R_IMG are sequentially checked by the image sensor 30, memory buffer(s) is not required, which may save the circuit area of the image sensor 30 as well.

Figure 7:
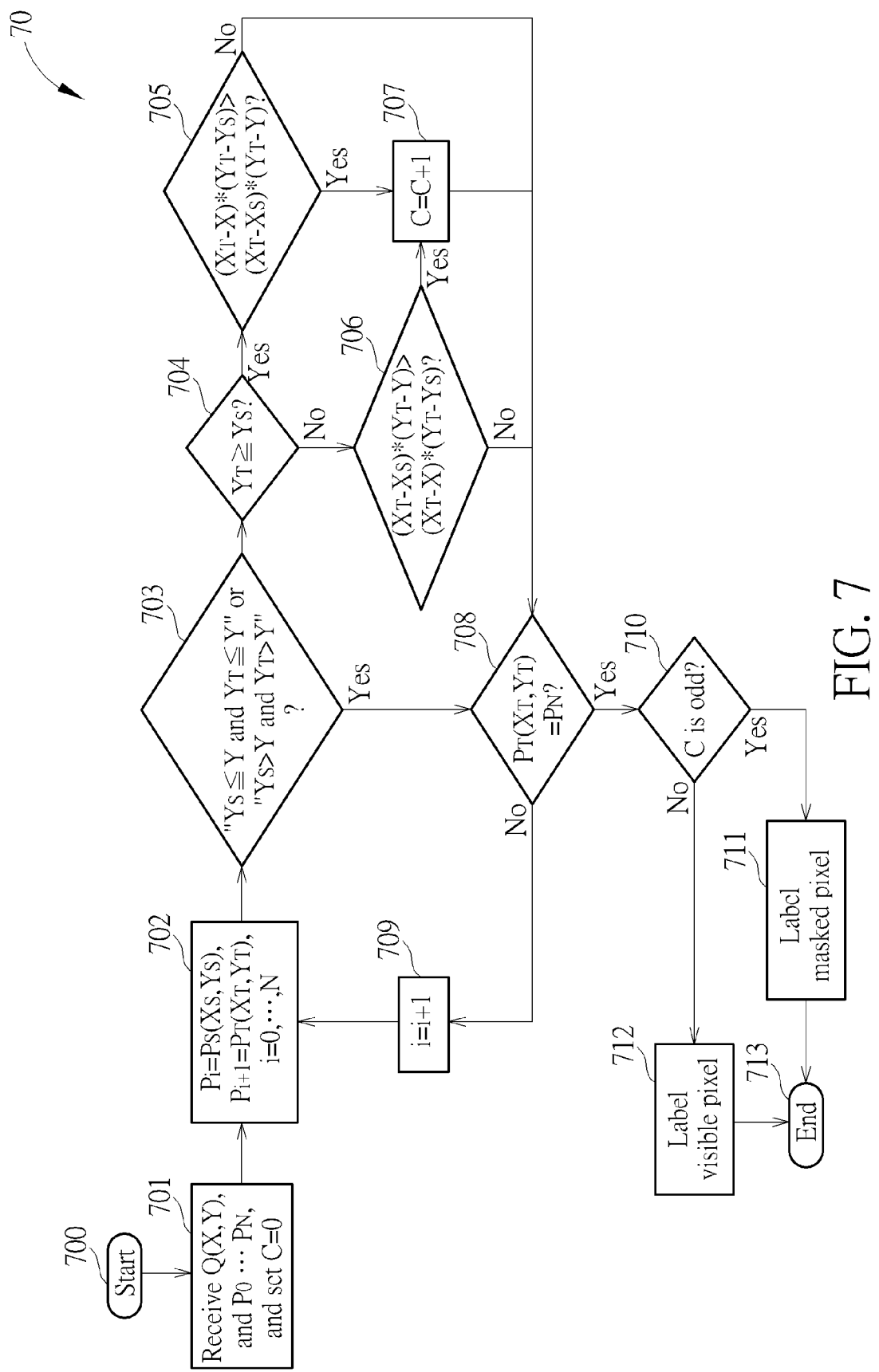
FIG. 7 illustrates a flowchart of a process according to a second embodiment of the present invention.

Note that the process 60 is an example of the present invention, those skilled in the art may make modification or alterations accordingly, which is not limited. For example, please refer to FIG. 7, which illustrates a flowchart of a process 70 according to a second embodiment of the present invention. The process 70 may be executed by the image sensor 30 to determine whether the pixel Q is inside or outside the polygonal mask having N edges. The process 70 includes the following steps:

Step 700: Start.

Step 701: Receive a pixel Q(X,Y) and a vertices array including vertices $P_0$ to $P_N$, and set a count C to be zero.

Step 702: Set a vertex $P_i$ to be a start point $P_S(X_S,Y_S)$, and a vertex $P_{i+1}$ to be a terminal point $P_T(X_T,Y_T)$, wherein an indication i is 0, . . . , N.

Step 703: Check if a condition "$Y_S \leq Y$ and $Y_T \leq Y$" or "$Y_S > Y$ and $Y_T > Y$" is satisfied? Go to Step 708 if yes; go to Step 704 if no.

Step 704: Check if $Y_T \geq Y_S$? Go to Step 705 if yes; go to Step 706 if no.

Step 705: Check if $(X_T-X)*(Y_T-Y_S)$ is greater than $(X_T-X_S)*(Y_T-Y)$? Go to Step 707 if yes; go to Step 708 if no.

Step 706: Check if $(X_T-X_S)*(Y_T-Y)$ is greater than $(X_T-X)*(Y_T-Y_S)$? Go to Step 707 if yes; go to Step 708 if no.

Step 707: Increase the count C by one.

Step 708: Check if the terminal point $P_T(X_T,Y_T)$ is the vertex $P_N$? Go to Step 710 if no; go to Step 711 if yes.

Step 709: Increase the indication i by one. Go to Step 702.

Step 710: Check if the count C is odd? Go to Step 712 if yes; go to Step 713 if no.

Step 711: Label the pixel Q to be a masked pixel. End.

Step 712: Label the pixel Q to be a visible pixel.

Step 713: End.

Steps 705 and 706 of the process 70 may be equivalent to Steps 605 to 607 of the process 60. For the case that the edge $\overline{P_S P_T}$ directs upwardly, according to function (3.2), the cross product RC being positive or negative may be obtained by comparing a former item $(X_T-X)*(Y_T-Y_S)$ with a later item $(X_T-X_S)*(Y_T-Y)$. On the other hand, for the case that the edge $\overline{P_S P_T}$ directs downwardly, the cross product RC being positive or negative may be obtained by comparing the later item $(X_T-X_S)*(Y_T-Y)$ with the former item $(X_T-X)*(Y_T-Y_S)$.

In detail, in Step 705, the image sensor 30 may check if the item $(X_T-X)*(Y_T-Y_S)$ is greater than the item $(X_T-X_S)*(Y_T-Y)$ to determine that the cross product RC in Step 605 is greater than zero. In Step 706, the sensor 30 may check if the item $(X_T-X_S)*(Y_T-Y)$ is greater than the item $(X_T-X)*(Y_T-Y_S)$ to determine that the cross product RC in Step 606 is greater than zero.

As a result, Step 607 of the process 60 may be respectively combined with Steps 605 and 606 to be Steps 706 and 706 of the process 70, which may simplify operations and the circuit area of the image sensor 30.

Figure 8:
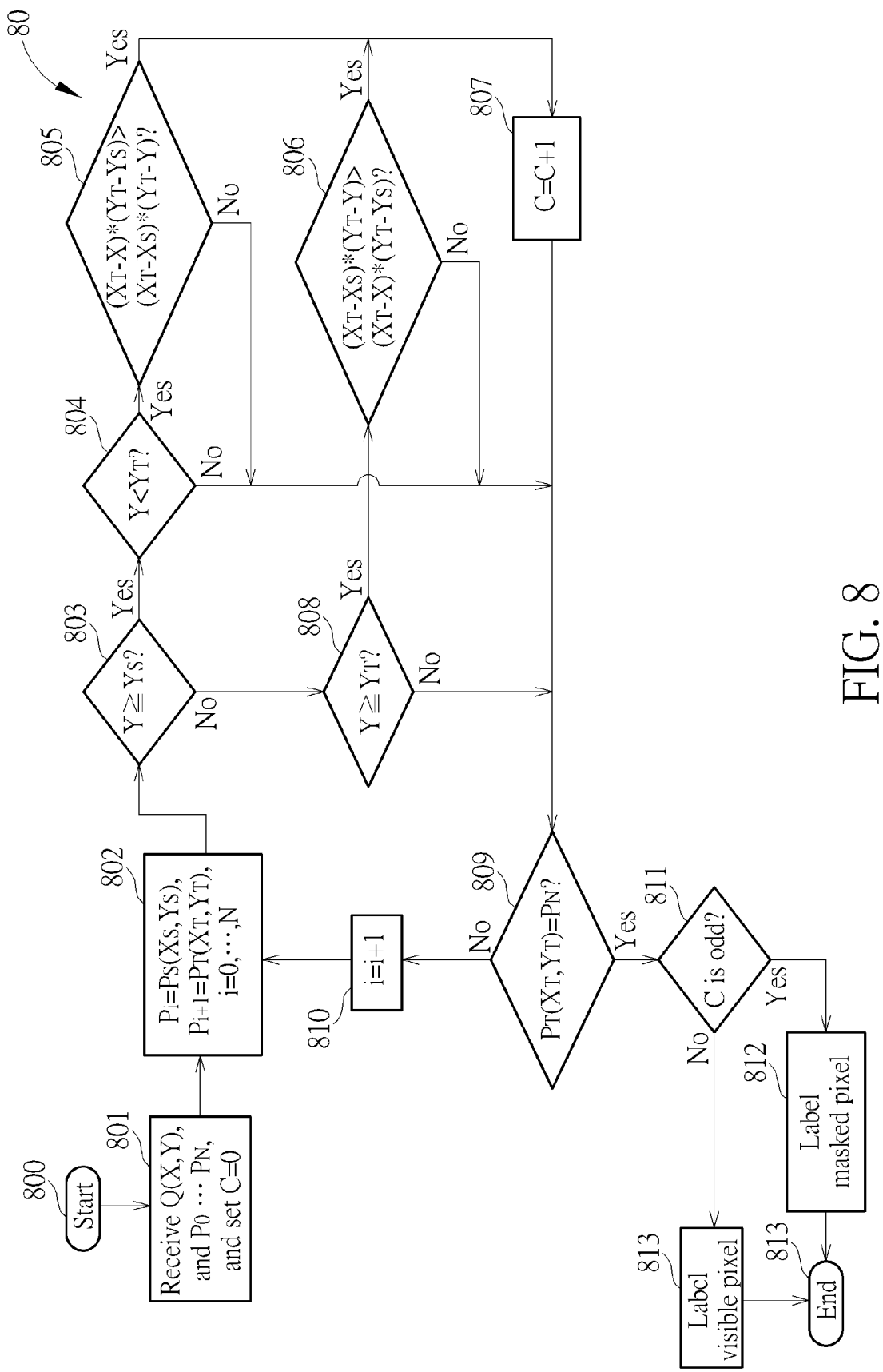
FIG. 8 illustrates a flowchart of a process according to a third embodiment of the present invention.

Please refer to FIG. 8, which illustrates a flowchart of a process 80 according to a third embodiment of the present invention. The process 80 may be executed by the image sensor 30 to determine whether the pixel Q is inside or outside the polygonal mask having N edges. The process 80 includes the following steps:

Step 800: Start.

Step 801: Receive a pixel Q(X,Y) and a vertices array including vertices $P_0$ to $P_N$, and set a count C to be zero.

Step 802: Set a vertex $P_i$ to be a start point $P_S(X_S,Y_S)$, and a vertex $P_{i+1}$ to be a terminal point $P_T(X_T,Y_T)$, wherein an indication i is 1, . . . , N.

Step 803: Check if $Y \geq Y_S$ ? Go to Step 804 if yes; go to Step 808 if no.

Step 804: Check if $Y < Y_T$? Go to Step 805 if yes; go to Step 809 if no.

Step 805: Check if $(X_T-X)*(Y_T-Y_S)$ is greater than $(X_T-X_S)*(Y_T-Y)$? Go to Step 807 if yes; go to Step 809 if no.

Step 806: Check if $(X_T-X_S)*(Y_T-Y)$ is greater than $(X_T-X)*(Y_T-Y_S)$? Go to Step 807 if yes; go to Step 809 if no.

Step 807: Increase the count C by one. Go to Step 809.

Step 808: Check if $Y \geq Y_T$? Go to Step 806 if yes; go to Step 809 if no.

Step 809: Check if the terminal point $P_T(X_T,Y_T)$ is the vertex $P_N$? Go to Step 810 if no; go to Step 811 if yes.

Step 810: Increase the indication i by one. Go to Step 802.

Step 811: Check if the count C is odd? Go to Step 812 if yes; go to Step 813 if no.

Step 812: Label the pixel Q to be a masked pixel. End.

Step 813: Label the pixel Q to be a visible pixel.

Step 814: End.

Steps 803 and 804 of the process 80 may be equivalent to Steps 603 to 604 of the process 60 for the case that the edge $\overline{P_S P_T}$ directs upwardly. Yes of Step 803 and yes of Step 804 may be equivalent to ($Y_S \leq Y < Y_T$) so that the pixel Q(X,Y) is bounded by the edge $\overline{P_S P_T}$. On the other hand, yes of Step 803 and no of Step 804 may be equivalent to ($Y_S, Y_T \leq Y$) so that the pixel Q(X,Y) is out of boundary, and the image sensor 30 may proceed to Step 809.

Steps 803 and 808 of the process 80 may be equivalent to Steps 603 to 604 of the process 60 for the case that the edge $\overline{P_S P_T}$ directs downwardly. Yes of Step 803 and yes of Step 808 may be equivalent to ($Y_T \leq Y < Y_S$) so that the pixel Q(X,Y) is bounded by the edge $\overline{P_S P_T}$. On the other hand, yes of Step 803 and no of Step 808 may be equivalent to ($Y_S > Y, Y_T > Y$) so that the pixel Q(X,Y) is out of boundary, and the image sensor 30 may proceed to Step 809.

As a result, a combination of Steps 803, 804 and 808 may be used for both checking the direction of the edge $\overline{P_S P_T}$ of the polygonal mask and the boundary of the pixel Q(X,Y), which may simplify operations and the circuit area of the image sensor 30.

To sum up, the present invention provides a method to generate masking image using polygonal mask, in which pixels of a raw image are sequentially checked based on Even-Odd-Rule and Right-Hand-Rule to determine whether each pixels of the raw image is inside or outside the polygonal mask. Until all the pixels of the raw image are checked, the masking image may be completely generated. Noticeably, the method only involves simple calculations, e.g. logical comparison, add, minus and multiple operations, such that the method of the present invention may be realized by simple circuits to save the circuit area of the image sensor. In addition, since the pixels of the raw image are sequentially checked, there is no memory buffer required, which also saves the circuit area of the image sensor. As a result, image masking using the polygonal mask may be implemented on the front-end image capturing devices, the NVR/DVR and/or the user-end devices without the hardware limitation due to the memory buffer(s), which broadens a flexibility of the surveillance system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating a masking image using a general polygonal mask, comprising:

receiving a pixel of a raw image and a polygon vertices array corresponding to a polygonal mask;

determining whether the pixel is inside the polygonal mask;

labeling the pixel to be a masked pixel if the pixel is inside the polygonal mask, or labeling the pixel to be a visible pixel if the pixel is outside the polygonal mask; and outputting the masked pixel or the visible pixel to generate the masking image;

wherein determining whether the pixel is inside the polygonal mask comprises:

setting two consecutive vertices of the polygon vertices array to be a start point and a terminal point according to an indication, wherein the indication is one of numbers from zero to a number of edges of the polygonal mask;

checking if the pixel is bounded by the start and terminal points in a first dimension;

determining if the pixel is at a left side of a first vector according to a cross product and a direction of the first vector if the pixel is bounded by the start and terminal points in the first dimension;

increasing a count by one if the pixel is at the left side of the first vector;

checking whether relative locations between the pixel and all the edges of the polygonal mask are determined; and checking if the count is odd to determine whether the pixel is inside the polygonal mask if the relative locations between the pixel and all the edges of the polygonal mask are checked.

2. The method of claim 1, wherein determining whether the pixel is inside the polygonal mask comprises:

determining whether the pixel is inside the polygonal mask according to the count of a function of:

$$F(L, Q) = \begin{cases} 1: & \text{pixel } Q \text{ is at the left side of edge } L \\ 0: & \text{other} \end{cases},$$

wherein Q is the pixel, and L is the edge formed by two consecutive vertices of the polygon vertices array.

3. The method of claim 2, wherein the pixel is inside the polygonal mask if the count is odd, and the count is a function of:

$$C = \sum_{i=0}^{N} F(\overline{P_i P_{i+1}}, Q)$$

wherein C is the count, N is a number of edges of the polygonal mask, i is an indication, and $\overline{P_i P_{i+1}}$ is an edge formed by the two consecutive vertices of the polygon vertices array.

4. The method of claim 1, wherein checking whether the relative locations between the pixel and all the edges of the polygonal mask are determined comprises:

checking if the terminal point is a last vertex of the polygon vertices array if the pixel is not bounded by the first vector, if the cross product is smaller than zero, and after the count is increased by one; and increasing the indication by one if the terminal point is not the last vertex of the polygon vertices array to reset the start and terminal points according to the indication.

5. The method of claim 1, wherein the pixel is inside the polygonal mask if the count is odd, and the pixel is outside the polygonal mask if the count is even.

6. The method of claim 1, further comprising:

setting the count to be zero when receiving the pixel of the raw image and the polygon vertices array corresponding to the polygonal mask.

7. The method of claim 1, wherein determining if the pixel is at the left side of the first vector according to the cross product and the direction of the first vector comprises:

determining a direction of the first vector by comparing coordinates of the start and terminal points in the first dimension;

computing the cross product according to a function of: $RC=(X_T-X)*(Y_T-Y_S)-(X_T-X_S)*(Y_T-Y)$ if the first vector directs a first direction, wherein RC is the cross product, X, $X_S$ and $X_T$ are coordinates of the pixel, the start and terminal points in a second dimension, and Y, $Y_S$ and $Y_T$ are coordinates of the pixel, the start and terminal points in the first dimension;

computing the cross product according to a negative of the function if the first vector directs a second direction; and checking if the cross product is greater than zero to determine if the pixel is at the left side of the first vector, wherein the pixel is at the left side of the first vector if the cross product is greater than zero, and the pixel is at a right side of the first vector if the cross product is smaller than zero.

8. The method of claim 1, wherein determining if the pixel is at the left side of the first vector according to the cross product and the direction of the first vector comprises:

determining a direction of the first vector by comparing coordinates of the start and terminal points in the first dimension;

checking if a former item $(X_T-X)*(Y_T-Y_S)$ is greater than a later item $(X_T-X_S)*(Y_T-Y)$ if the first vector directs a first direction, wherein the pixel is at the left side of the first vector if the former item is greater than the later item; and checking if the former item $(X_T-X)*(Y_T-Y_S)$ is smaller than a later item $(X_T-X_S)*(Y_T-Y)$ if the first vector directs a second direction, wherein the pixel is at the left side of the first vector if the former item is smaller than the later item, wherein X, $X_S$ and $X_T$ are coordinates of the pixel, the start and terminal points in a second dimension, and Y, $Y_S$ and $Y_T$ are coordinates of the pixel, the start and terminal points in the first dimension.

* * * * *